# 3,050,196
Patented Aug. 21, 1962

3,050,196
SUPPORTING AND MOVING RETRACTABLE BOOMS
Herbert Yates, Kingsbury, London, England, assignor to Yates Plant Limited, London, England
Filed Aug. 25, 1960, Ser. No. 51,827
Claims priority, application Great Britain Sept. 1, 1959
5 Claims. (Cl. 212—55)

This invention relates to supporting and moving retractable booms particularly, but not exclusively, a boom carrying a welding head and mounted, vertically and horizontally movable, on a column so that the welding head can be positioned above a large workpiece for downhand welding.

It is usual to move such a boom horizontally through the column by rack and pinion or other gearing and this is not found always to give the smoothness and fine control of movement desirable for accurate positioning of the welding head at the workpiece.

The invention is applied to a boom structure comprising a boom carrier having a boom movably extending horizontally there-through and supported as a cantilever by rollers journalled in the carrier.

In accordance with the invention, at least one of the rollers is a frictional driving roller and each such driving roller is rubber-tired, or similarly resiliently rimmed, so that it has a resilient peripheral rim for driving contact with the boom and a rigid peripheral part, of smaller diameter than the rim, which part, under normal load, has a fine running clearance with the boom but limits compression of the resilient rim in the event of the load on the roller exceeding normal load.

Such rubber-tired, or similar, rollers give the advantage of good frictional drive combined with strong cantilever support, the rollers being strongly journalled in the carrier so that their axes are constant.

The preferred arrangement of the rollers is on horizontal axes transversely above and below the boom, for example two rollers, or coaxial sets of rollers, spaced horizontally apart above and below the boom and bearing vertically against upper and lower plane horizontal faces of the boom as on roller tracks.

The rollers could however be inclined-axis rollers bearing against inclined upper and lower lateral faces of the boom so as to support the boom as a cantilever. Even vertical-axis rollers, journalled so as to withstand end thrust during rotation and engaging faces of channels in the boom, could be used.

The preferred drive for the rollers is by one or more electric motors mounted on the carrier.

One example, according to the invention, of a frictional driving and cantilever roller support for the retractable boom of a welding column is illustrated, somewhat diagrammatically, on the accompanying drawing, in which.

Figure 1:
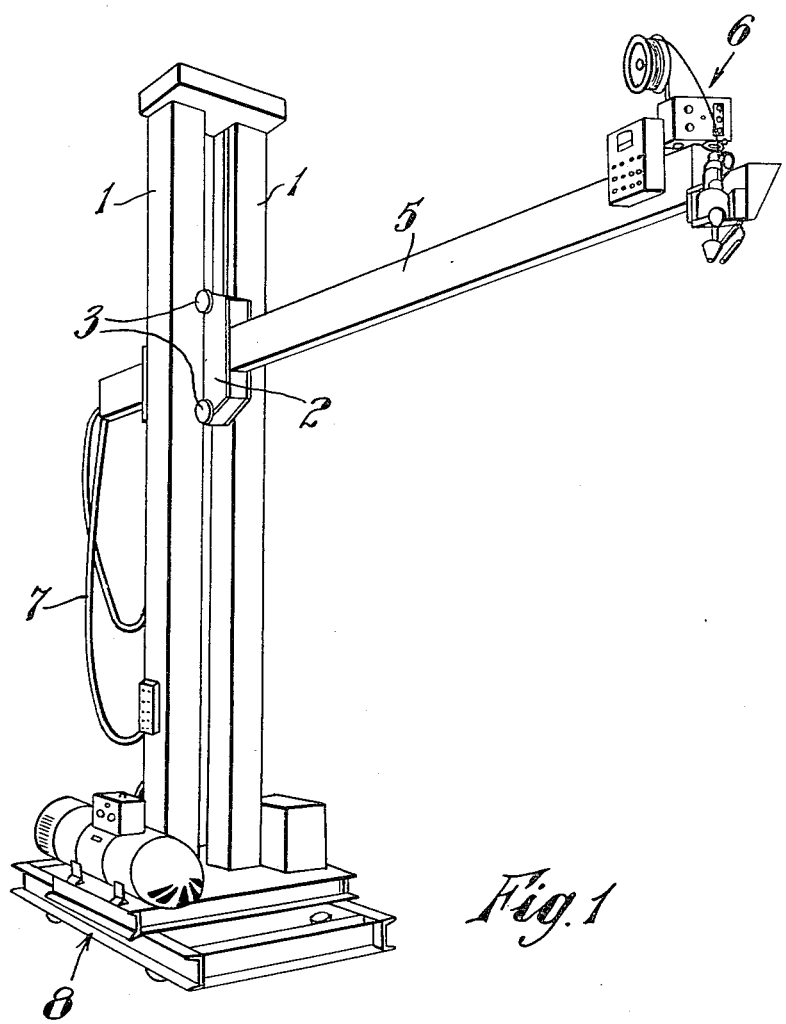
FIG. 1 is a perspective view of a column with a vertically movable carrier supporting a boom carrying a welding head.

FIG. 1 shows a column comprising twin pillars 1, on which is mounted a carrier 2, which is counterweighted and movable vertically, by means not shown. The carrier 2 is guided in its vertical movement by pairs of rollers 3 and 4 shown in FIGS. 3 and 4 as respectively plain and grooved, to run on V guide ribs 4¹, to give accurate guiding without binding. The carrier is fabricated from two metal side plates 2¹ and upper and lower plates 2² and 2³ forming an open-ended frame.

Carried by and horizontally movable through the carrier 2 is a boom 5 having at one end a welding head 6 to which power-supply cables 7 lead, through the boom which is of box-section, from power and welding control equipment mounted on a base 8 of the column. Apparatus of this kind is known generally as a welding column.

In accordance with the present invention, the boom 5 is supported as a cantilever by four double rubber-tired cast iron rollers 9 strongly journalled on horizontal axes in the carrier side plates 2¹ and arranged horizontally spaced apart two above and two below the boom. The vertical separation of the axes of the rollers 9, the radial projection and hardness of their rubber tires 10 and the vertical dimension of the boom 5 are all selected so that the boom can be inserted between the rollers 9, placing the rubber tires 10 under compression and leaving a fine running clearance between the upper and lower faces of the boom and peripheries 11 of the rigid cast iron body parts of the rollers 9 at normal loads and reaches of the boom. The rigid peripheral parts 11 of the rollers 9 limit to a small angle any canting of the boom under heavy load, e.g. at extreme reach of the welding head 6.

Figure 2:
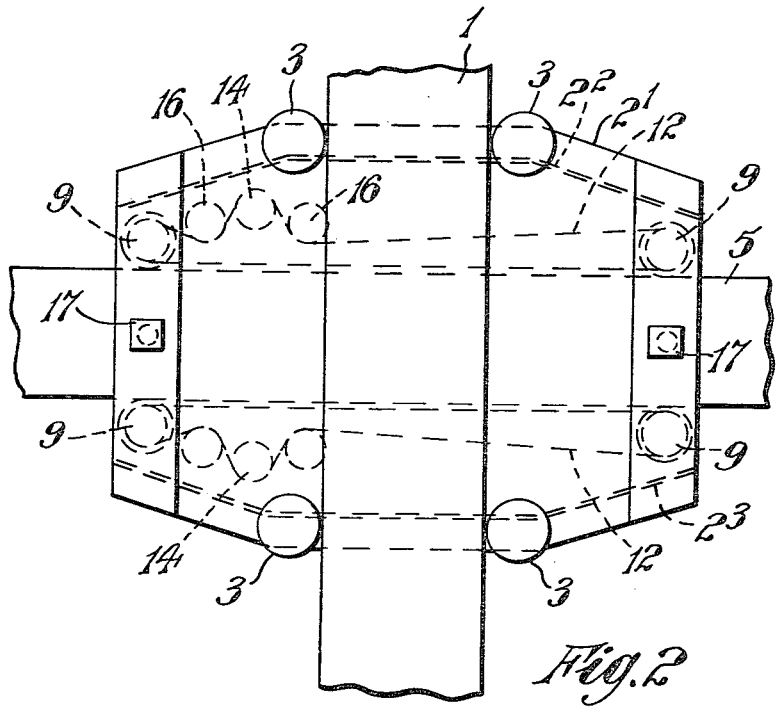
FIG. 2 is a fragmentary side elevation showing part of the column, the carrier and part of the boom.
Figure 3:
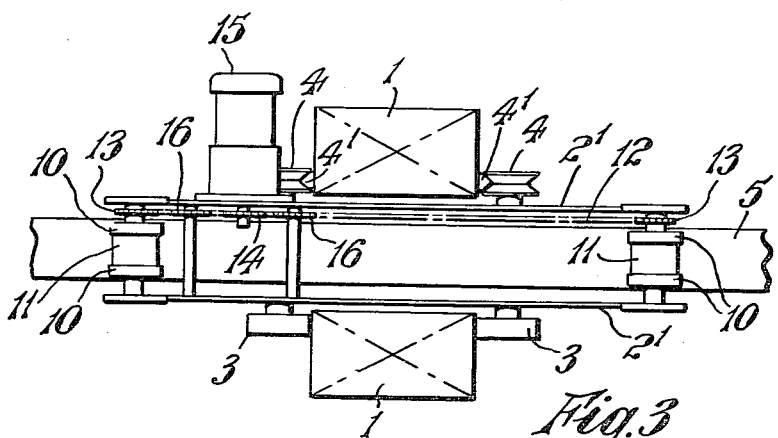
FIGS. 3 and 4 are respectively a sectional plan and an end elevation corresponding to FIG. 2
Figure 4:
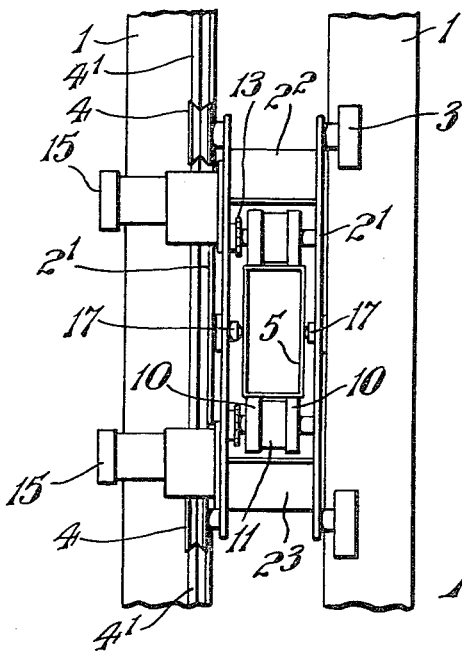

In the construction shown by FIGS. 2 to 4, the upper and lower rollers 9 are respectively interconnected in each case as a pair by a chain 12 around sprockets 13 on the roller shafts and a driving sprocket 14 driven by a geared variable speed D.C. motor 15. Jockey sprockets 16 maintain the chain tension. Preferably the motors 15 are electrically interconnected so as to run in parallel sharing the load, as is known for other uses of such motors.

A control is provided for the motors 15 so that, through the frictional driving rollers 9, the boom can be traversed through the carrier at any desired speed, for example relatively fast for positioning of the welding head 6 above a workpiece and then slowly during welding.

In the side plates of the carrier are mounted ball-type castors 17 which bear against the side faces of the boom and serve as anti-friction guides to locate the boom laterally in its horizontal longitudinal movement.

Figure 5:
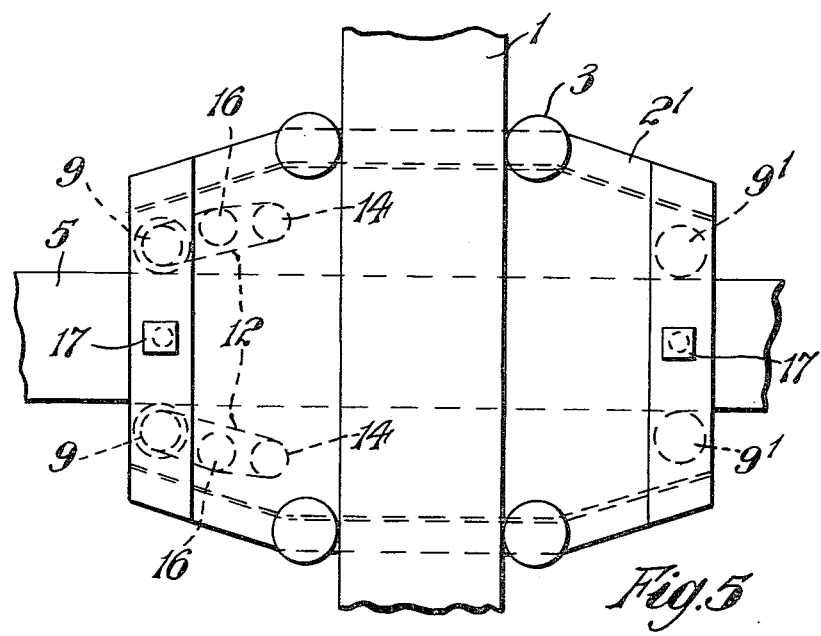
FIG. 5 is a fragmentary side elevation, similar to FIG. 2, showing an alternative drive.

In the construction shown by FIG. 5, intended for light duty, only one roller 9, of each pair above and below the boom, is driven. The other roller 9¹ of each pair can be a double rubber-tires roller, like the driving roller, or can be a plain roller of a suitably rigid form since it serves only to support and guide the boom and not to drive it.

I claim:

1. A boom structure comprising a boom carrier, a boom movably extending horizontally through said carrier and rollers journalled in said carried and supporting said boom as a cantilever in said carrier, in which at least one of said'rollers is a frictional driving roller, for horizontal movement of said boom, and has a resilient peripheral rim, in frictional driving contact with said boom, and a rigid peripheral part of smaller diameter than said rim to limit radial compression of said rim under the load of said boom.

2. A structure according to claim 1, in which said rollers are journalled on horizontal axes transversely of the boom in said carrier, said boom has plane horizontal upper and lower faces and at least two of said rollers are above the boom and two thereof below the boom and are spaced horizontally apart longitudinally of said boom and in rolling contact with said upper and lower faces respectively.

3. A structure according to claim 2, in which said two rollers above the boom and the two thereof below the boom are all frictional driving rollers having each said resilient peripheral rim and said rigid peripheral part.

4. A structure according to claim 1, and anti-friction guide means mounted in said carrier and bearing on longitudinally extending side faces of said boom.

5. A structure according to claim 1 a column on which said carrier is mounted for vertical movement thereon and at least one electric motor mounted on said carrier and drivingly connected at at least one of said driving rollers.

References Cited in the file of this patent

UNITED STATES PATENTS

| | | |
|---|---|---|
| 2,082,018 | McClain | June 1, 1937 |
| 2,684,159 | Oldenkamp | July 20, 1954 |
| 2,993,605 | Smith | July 25, 1961 |